(12) United States Patent
Lin et al.

(10) Patent No.: US 12,512,650 B2
(45) Date of Patent: Dec. 30, 2025

(54) HAND TOOL WITH STRIPPING FUNCTION

(71) Applicant: Hanlong Industrial Co., Ltd., New Taipei (TW)

(72) Inventors: Pai-Wei Lin, New Taipei (TW); Hsiu-Ru Lu, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 398 days.

(21) Appl. No.: 18/312,645

(22) Filed: May 5, 2023

(65) Prior Publication Data

US 2024/0063616 A1 Feb. 22, 2024

(30) Foreign Application Priority Data

Aug. 18, 2022 (TW) .................................. 111209026

(51) Int. Cl.
*H02G 1/12* (2006.01)
(52) U.S. Cl.
CPC ................................. *H02G 1/1212* (2013.01)
(58) Field of Classification Search
CPC .... B25B 5/02; B25B 5/04; B25B 5/06; B25B 7/00; B25B 7/02; B25B 7/04; B25B 7/12; B25B 7/22; H02G 1/12; H02G 1/1212; H02G 1/1236; H02G 1/1273
See application file for complete search history.

(56) References Cited

U.S. PATENT DOCUMENTS

| | | | | |
|---|---|---|---|---|
| 6,439,084 B1* | 8/2002 | Ebert | .................... | H02G 1/1212 81/9.41 |
| 7,096,760 B2* | 8/2006 | Schmode | ............. | H02G 1/1212 81/9.41 |
| 8,863,620 B2* | 10/2014 | Yen | ...................... | H02G 1/1273 81/9.41 |

* cited by examiner

*Primary Examiner* — Robert J Scruggs
(74) *Attorney, Agent, or Firm* — Best & Flanagan LLP

(57) ABSTRACT

A hand tool with a stripping function comprises a first body, a second body, a first and a second handle plier, a pivot, an upper jaw section, and a lower jaw section. The first and second bodies respectively have a first and a second moving piece and a first and a second fixing member. The second handle plier is arranged symmetrically with the first handle plier and connected to the second moving piece. The pivot is pivotally connected to the first and second bodies and to the first and second handle pliers at the same time. When the first and second handle pliers converge, the movement of the first and second moving pieces drives the upper jaw section to move closer to the lower jaw section such that the insulating layer of the cable can be cut and separated by continuous pressing.

4 Claims, 8 Drawing Sheets

HAND TOOL WITH STRIPPING FUNCTION

BACKGROUND OF THE INVENTION

1. Field of the Invention

The present invention relates to a hand tool with a stripping function.

2. Description of the Related Art

In the prior art of the wire stripping method of coaxial cable or round telephone wire, etc., commonly used methods include direct cutting with a blade or using needle-nose pliers to strip the insulation from the wire. However, the use of a blade or the needle-nose pliers to cut the insulation layer presents the risk of damaging the wire. Thus, it is inconvenient for the user.

Therefore, it is necessary to invent a new hand tool with a stripping function to mitigate and/or obviate the aforementioned problems.

SUMMARY OF THE INVENTION

It is a primary object of the present invention to provide a hand tool with a stripping function.

To achieve the above objective, the hand tool with a stripping function of the present invention is used to cut an insulation layer of a cable. The hand tool with the stripping function comprises a first body, a second body, a first handle plier, a second handle plier, a pivot, an upper jaw section, and a lower jaw section. The first body has a first moving piece and a first fixing member. The second body is arranged symmetrically with the first body and has a second moving piece and a second fixing member. The first handle plier is connected to the first moving piece. The second handle plier is arranged symmetrically with the first handle plier and connected to the second moving piece. The pivot is pivotally connected to the first body, the second body, the first handle plier, and the second handle plier simultaneously. The upper jaw section is connected to the first moving piece and the second moving piece. The lower jaw section is connected to the first fixing member and the second fixing member, wherein the upper jaw section is arranged symmetrically with the lower jaw section. When the first handle plier and the second handle plier are pressed, a movement of the first moving piece and the second moving piece causes the upper jaw section to approach the lower jaw section so as to cut the insulating layer of the cable. When the first handle plier and the second handle plier are pressed continuously, the first body and the second body are symmetrically opened to remove the section of the insulating layer which has been cut.

DETAILED DESCRIPTION OF THE PREFERRED EMBODIMENTS

The advantages and innovative features of the invention will become more apparent from the following detailed descriptions when taken in conjunction with the accompanying drawings.

Figure 1:
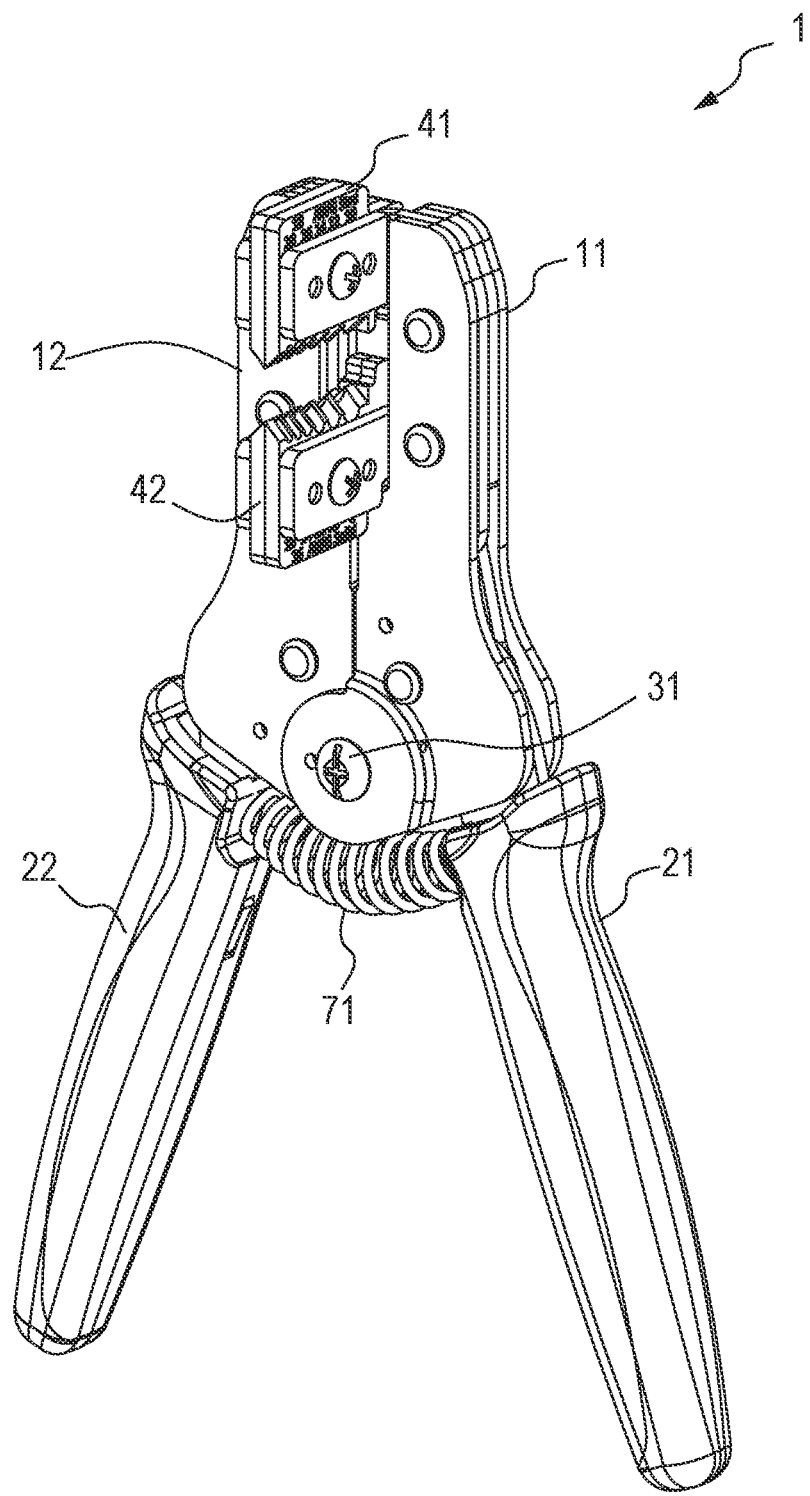
FIG. 1 illustrates a three-dimensional schematic diagram of a hand tool with a stripping function of the present invention.

First, please refer to FIG. 1, which illustrates a three-dimensional schematic diagram of a hand tool with a stripping function of the present invention.

The present invention provides a hand tool 1 with a stripping function. It should be noted that, although the terms "first" and "second" are used to describe the elements, the elements are not limited by such terms. The terms are for merely differentiating one element from another element. For example, without departing from the scope of the described embodiments, a first body can be referred to as a second body, and a second body can be similarly referred to as a first body. The first body and the second body are both bodies but are not the same body.

In an embodiment of the present invention, the hand tool 1 comprises a first body 11, a second body 12, a first handle plier 21, a second handle plier 22, a pivot 31, an upper jaw section 41, and a lower jaw section 42. The first body 11 is arranged symmetrically with the second body 12. The first plier 21 and the second plier 22 are also symmetrically arranged for the user to hold. The first plier 21, the second plier 22, the first body 11 and the second body 12 are jointly pivoted by the pivot 31 such that the first plier 21 and the second plier 22 can rotate relatively. However, when the first plier 21 and the second plier 22 are rotated, the first body 11 and the second body 12 do not rotate together.

Figure 6A:
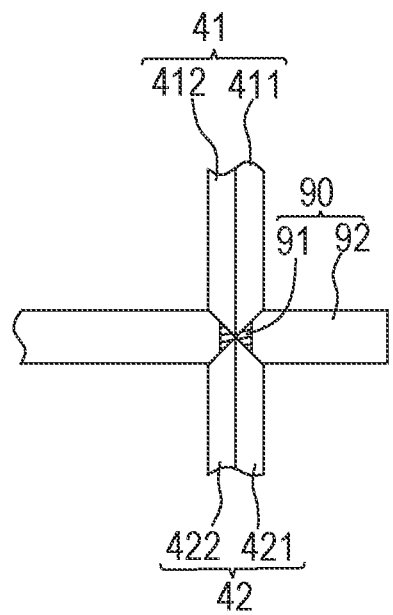
FIGS. 6A-6B illustrate schematic diagrams with continuous motion of the hand tool with a stripping function of the present invention.

The upper jaw section 41 also corresponds to the lower jaw section 42. In the embodiment of the present invention, the surfaces of the upper jaw section 41 and the lower jaw section 42 may have serrated blades of different degrees to match the cables 90 (as shown in FIG. 6A) of different diameters. In this way, when the upper jaw section 41 and the lower jaw section 42 converge, the insulating layer 92 of the cable 90 can be cut and conveniently peeled off.

Figure 2:
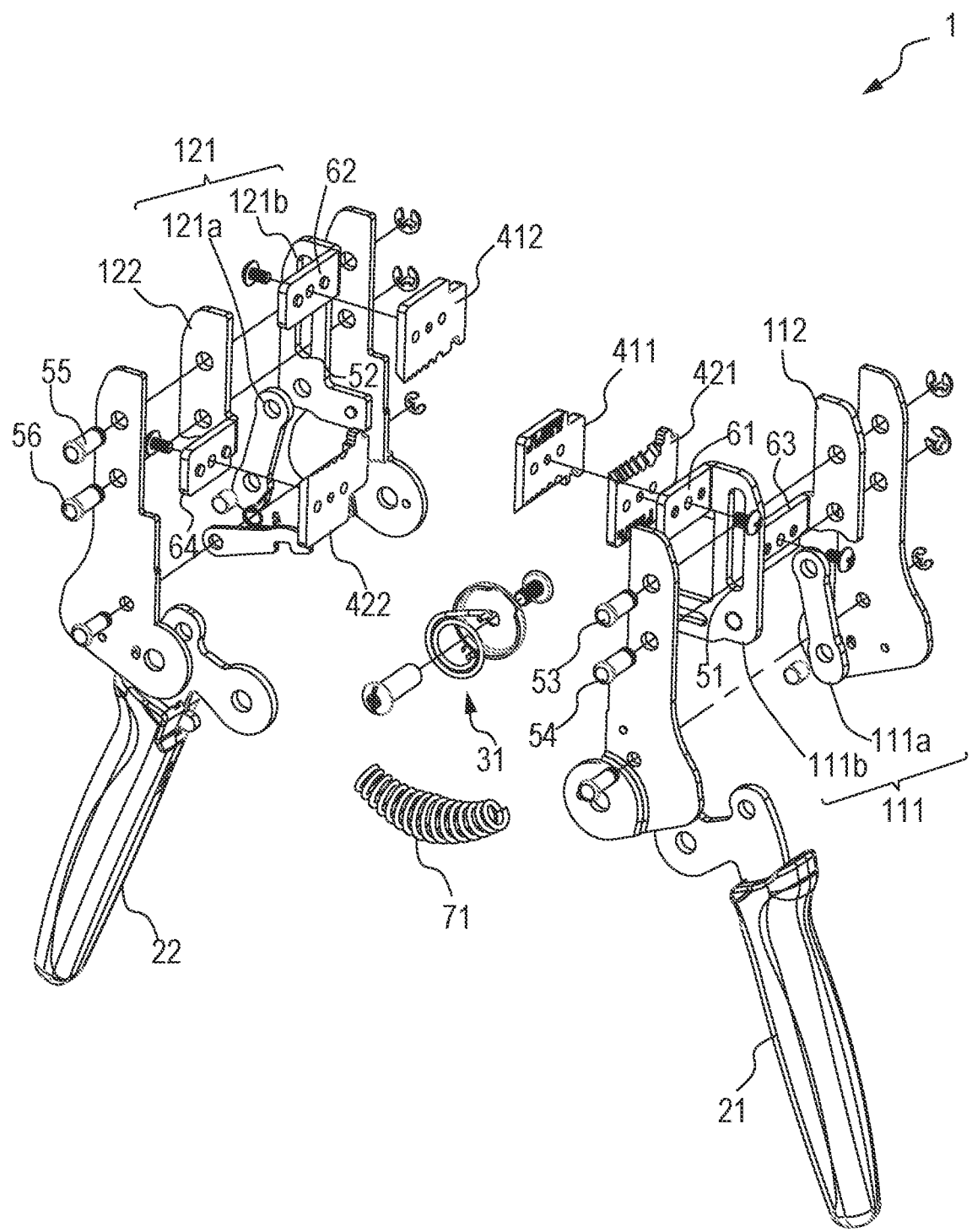
FIG. 2 illustrates a decomposition diagram of the hand tool with a stripping function of the present invention.

Now please refer to FIG. 2, which illustrates a decomposition diagram of the hand tool with a stripping function of the present invention.

In the embodiment of the present invention, the first body 11 comprises a first moving piece 111 and a first fixing member 112, and the second body 12 comprises a second moving piece 121 and a second fixing member 122. The upper jaw section 41 can be divided into a first upper jaw section 411 and a second upper jaw section 412, and the first upper jaw section 411 and the second upper jaw section 412 are respectively connected to the first moving piece 111 and the second moving piece 121. The lower jaw section 42 can also be divided into a first lower jaw section 421 and a second lower jaw section 422. The first lower jaw section 421 and the second lower jaw section 422 are respectively connected to the first fixing member 112 and the second fixing member 122. The first moving piece 111 further comprises a first connecting rod 111a and a first L-shaped structure 111b. The first connecting rod 111a is connected to the first handle plier 21, and the first L-shaped structure 111b is connected to the first connecting rod 111a and the first upper jaw section 411. The second moving piece 121 further comprises a second connecting rod 121a and a second L-shaped structure 121b. The second connecting rod 121a is connected to the second handle plier 22. The second L-shaped structure 121b is connected to the second connecting rod 121a and the second upper jaw section 412. The first L-shaped structure 111b and the second L-shaped structure 121b can also be connected to each other.

In the embodiment of the present invention, the hand tool 1 further comprises a first clamping member 61, a second clamping member 62, a third clamping member 63, and a fourth clamping member 64. The first clamping member 61 is vertically connected to the first L-shaped structure 111b and fixedly connected to the first upper jaw section 411. The second clamping member 62 is vertically connected to the second L-shaped structure 121b and fixedly connected to the second upper jaw section 412. The third clamping member 63 is vertically connected to the first fixing member 112 and fixedly connected to the first lower jaw section 421. The fourth clamping member 64 is vertically connected to the second fixing member 122 and fixedly connected to the second lower jaw section 422. In this way, the upper jaw section 41 and lower jaw section 42 are vertical.

The hand tool 1 of the present invention further comprises a compression spring 71. One end of the compression spring 71 is connected to the first handle plier 21 and another end of the compression spring 71 is connected to the second handle plier 22 such that the first handle plier 21 and the second handle plier 22 are separated by the force of the compression spring 71 when no force is applied to the first handle plier 21 and the second handle plier 22 by the user.

Figure 3:
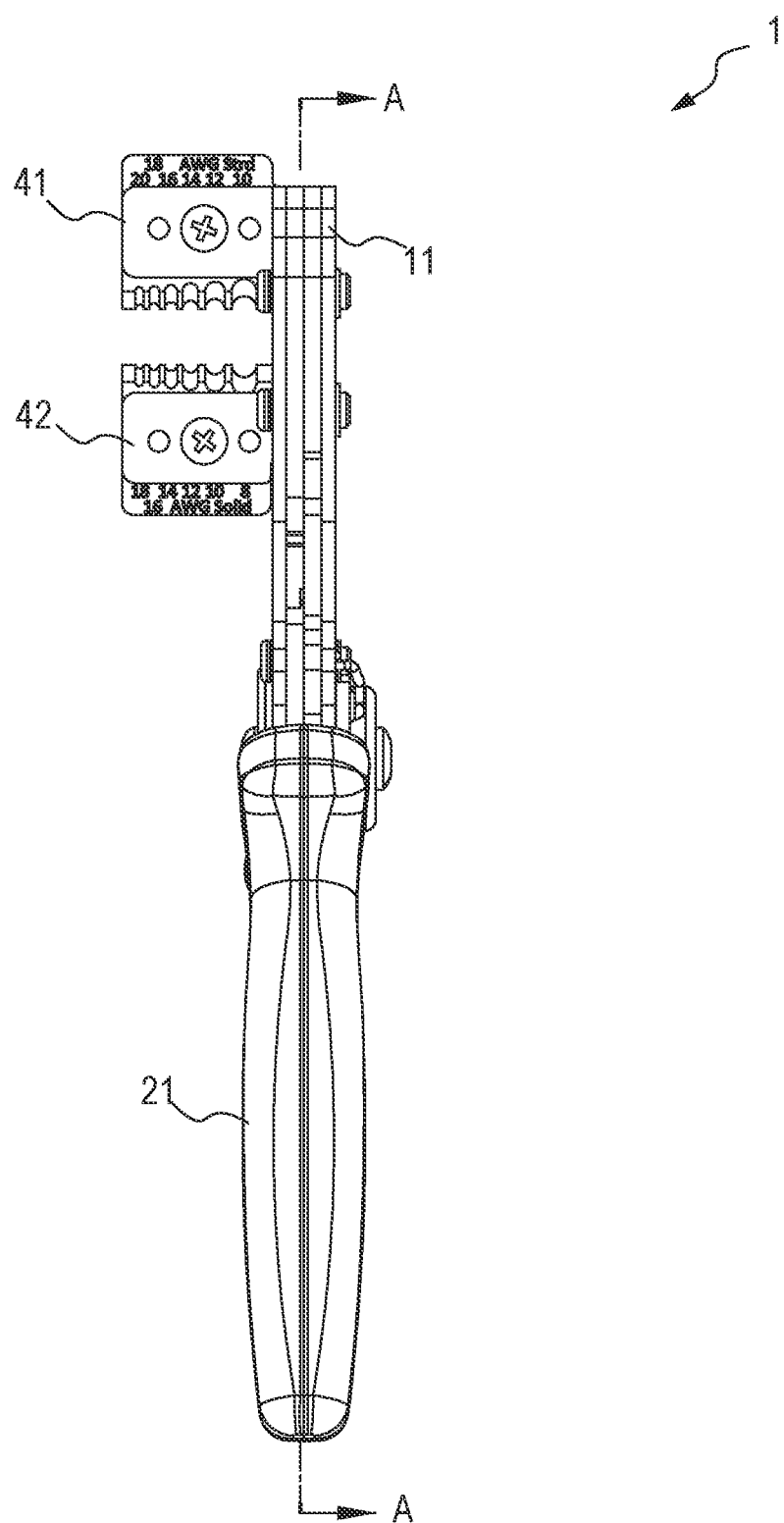
FIG. 3 illustrates a side view of the hand tool with a stripping function of the present invention before force is applied.
Figure 3A:
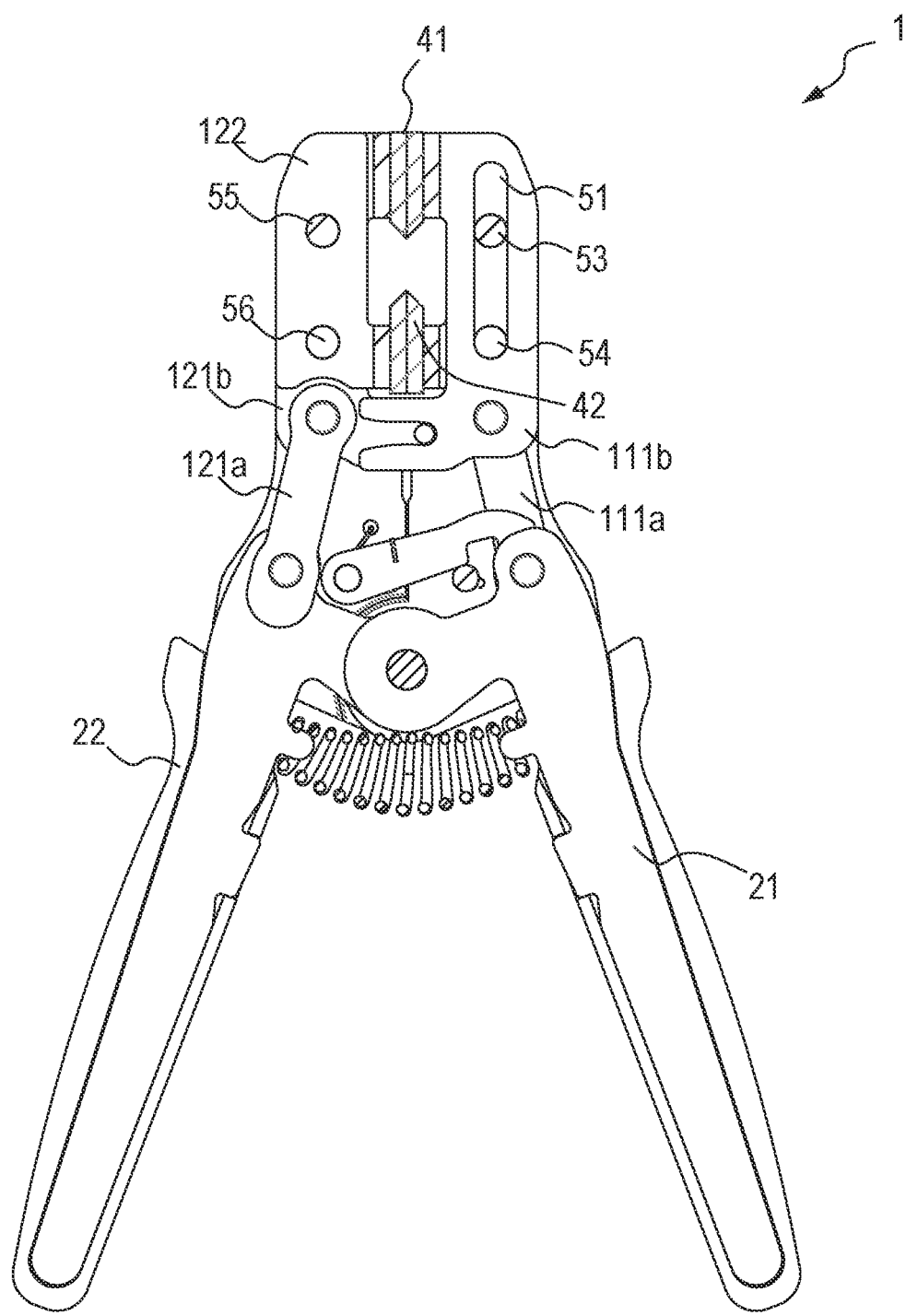
FIG. 3A illustrates a cutaway drawing of the hand tool with a stripping function of the present invention before force is applied along the A-A direction of FIG. 3.

Now please refer to FIG. 3, which illustrates a side view of the hand tool with a stripping function of the present invention before force is applied along the A-A direction of FIG. 3, and to FIG. 3A, which illustrates a cutaway drawing of the hand tool with a stripping function of the present invention before force is applied along the A-A direction of FIG. 3.

The first handle plier 21 is connected to the first L-shaped structure 111b via the first connecting rod 111a, and the first L-shaped structure 111b is then fixedly connected to the upper jaw section 411. Similarly, the second handle plier 22 is connected to the second L-shaped structure 121b via the second connecting rod 121a, and the second L-shaped structure 121b is then fixedly connected to the upper jaw section 412.

Figure 4:
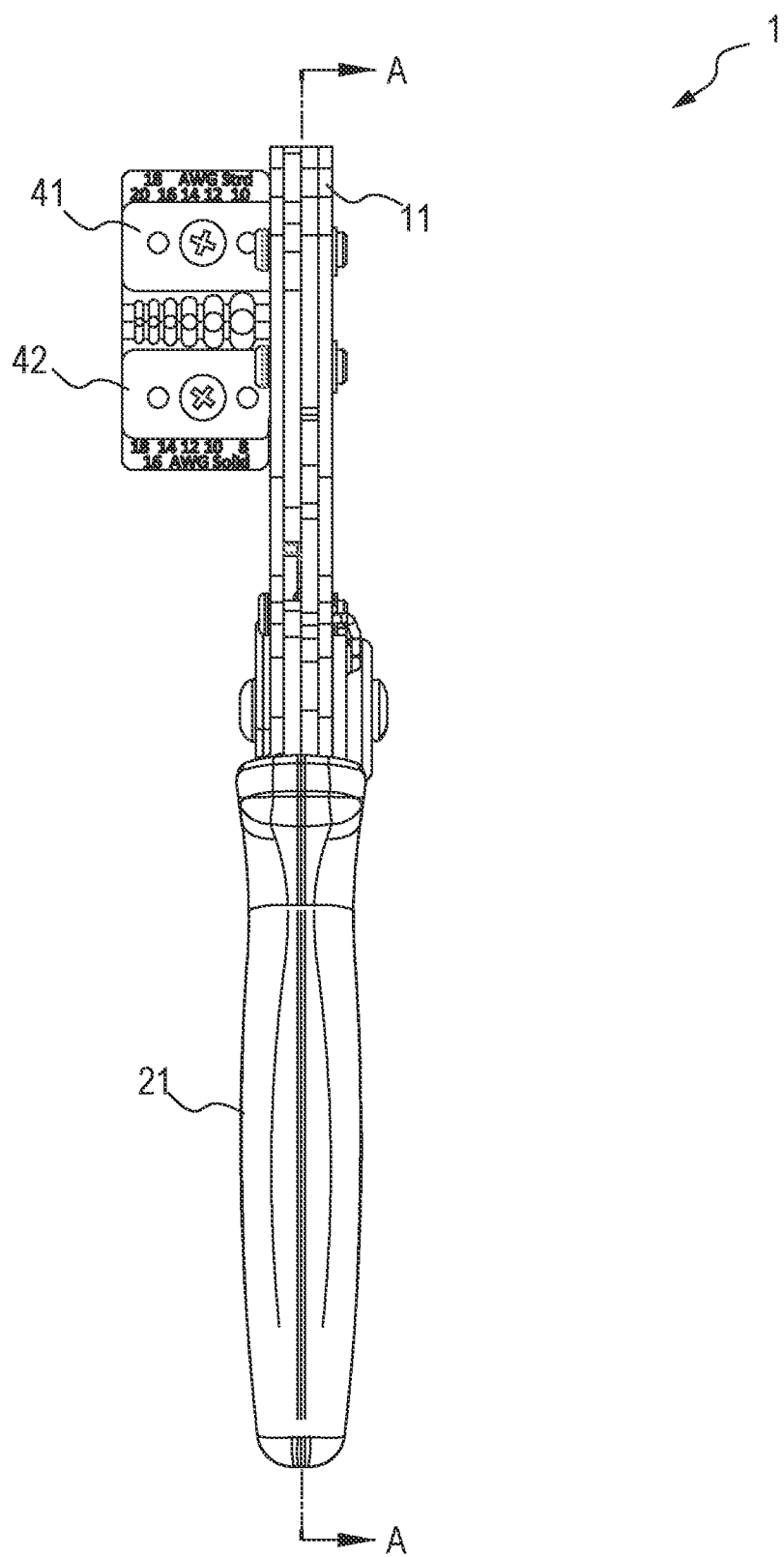
FIG. 4 illustrates a side view of the hand tool with a stripping function of the present invention when force is applied.
Figure 4A:
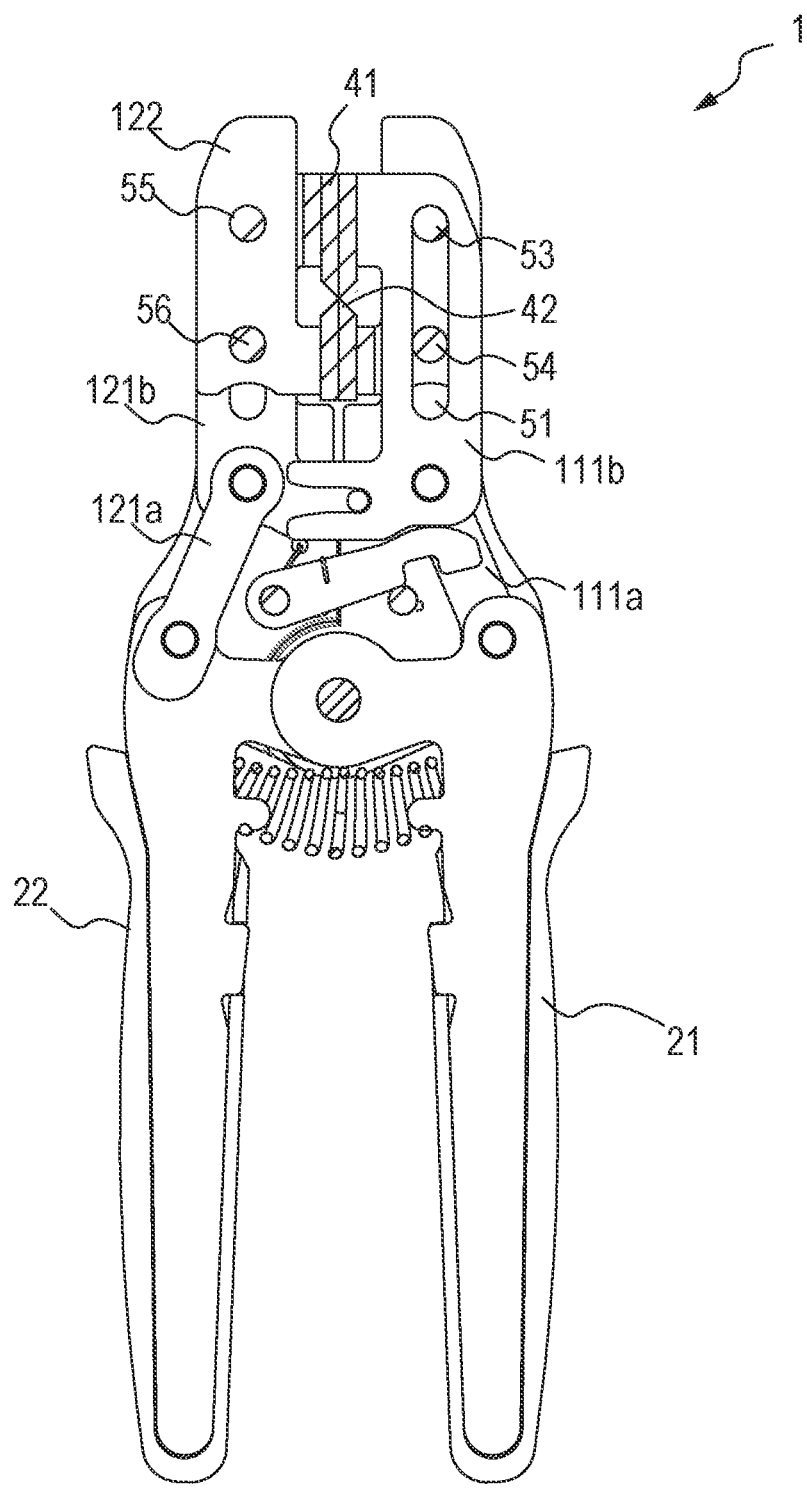
FIG. 4A illustrates a cutaway drawing of the hand tool with a stripping function of the present invention when force is applied along the A-A direction of FIG. 4.

Now please refer to FIG. 4, which illustrates a side view of the hand tool with a stripping function of the present invention after force is applied, and to FIG. 4A, which illustrates a cutaway drawing of the hand tool with a stripping function of the present invention after force is applied along the A-A direction of FIG. 4.

When the user presses the first handle plier 21 and the second handle plier 22, the first L-shaped structure 111b is driven by the first connecting rod 111a to move downward, and the second L-shaped structure 121b is driven by the second connecting rod 121a to move downward. Therefore, the first upper jaw section 411 and the second upper jaw section 412 are jointly moved toward the first lower jaw section 421 and the second lower jaw section 422. In this way, when a cable 90 is put into the upper jaw section 41 and the lower jaw section 42 and then the first handle plier 21 and the second handle plier 22 converge, the upper jaw section 41 are driven by the first connecting rod 111a to move downward. Thus, the upper jaw section 41 and the lower jaw section 42 can hold the cable 90 such that the serrated blade cuts the insulating layer 92 of the cable 90 but does not cut the core wire 91 inside the cable 90.

In the embodiment of the present invention, the first L-shaped structure 111b can have a first slot 51, and the second L-shaped structure 121b can have a second slot 52. Both the first slot 51 and the second slot 52 can be long strips. The first slot 51 can be used to match the first limiter 53 and the second limiter 54, and the second slot 52 can be used to match the third limiter 55 and the fourth limiter 56. The first limiter 53 and the second limiter 54 can be connected through the first fixing member 112, and the third limiter 55 and the fourth limiter 56 can be connected through the second fixing member 122. When the first L-shaped structure 111b or the second L-shaped structure 121b moves, the first L-shaped structure 111b or the second L-shaped structure 121b will abut the first limiter 53, the second limiter 54, the third limiter 55 or the fourth limiter 56, respectively. As shown in FIG. 3A, the position of the first L-shaped structure 111b or the second L-shaped structure 121b is such that the second limiter 54 abuts one end of the first slot 51 and the fourth limiter 56 abuts one end of the second slot 52. In FIG. 4A, the first L-shaped structure 111b or the second L-shaped structure 121b move such that the first limiter 53 will abut the other end of the first slot 51, and the third limiter 55 will abut the other end of the second slot 52. Therefore, the range of the up and down movement of the first L-shaped structure 111b and the second L-shaped structure 121b can be limited such that the first L-shaped structure 111b or second L-shaped structure 121b will not slip off.

Figure 5:
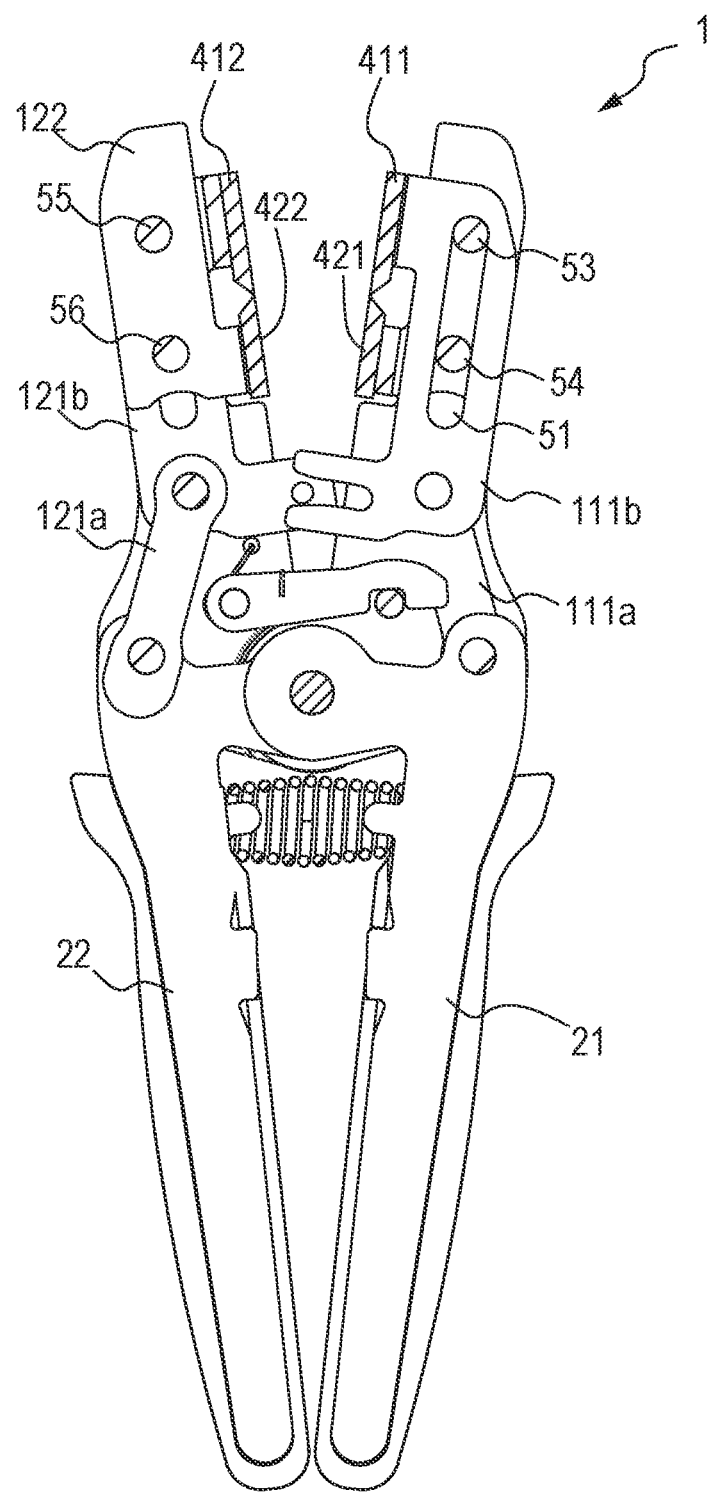
FIG. 5 illustrates a cutaway drawing of the hand tool with a stripping function of the present invention after continuous pressing.

Finally, please refer to FIG. 5, which illustrates a cutaway drawing of the hand tool with a stripping function of the present invention after continuous pressing.

When the user continuously presses the first handle plier 21 and the second handle plier 22, the first connecting rod 111a and the second connecting rod 121a cause the first L-shaped structure 111b and the second L-shaped structure 121b to move downwards continuously, which in turn causes the first body 11 and the second body 12 to be separated, and the upper jaw section 41 and lower jaw section 42 are also divided into two parts. That is, the first upper jaw section 411 and the second upper jaw section 412 of the upper jaw section 41 are separated, and the first lower jaw section 421 and the second lower jaw section 422 of the lower jaw section 42 are also separated. In this way, the first upper jaw section 411 and the first lower jaw section 421 sandwich a section of the insulating layer 92, and the second upper jaw section 412 and the second lower jaw section 422 sandwich another section of the insulating layer 92. Thus, the insulating layer 92 that has been cut can be easily removed from the wire.

Figure 6B:
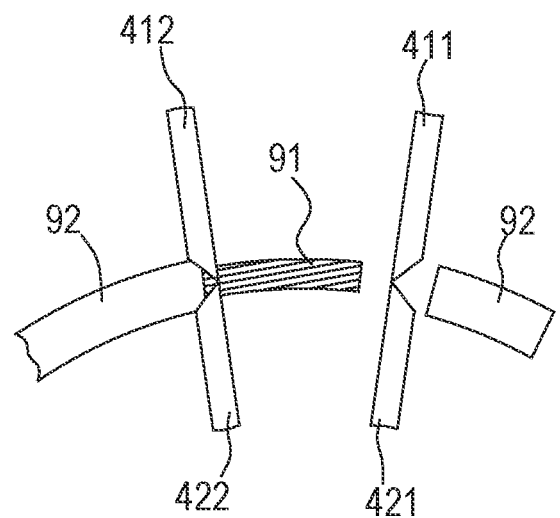

Please refer to FIGS. 6A-6B, which illustrate schematic diagrams of the continuous motion of the hand tool with a stripping function of the present invention.

As shown in FIG. 6A, when the first handle plier 21 and the second handle plier 22 are held close together, the serrated blades of the upper jaw section 41 and the lower jaw section 42 can cut the insulating layer 92 of the cable 90 but not cut the core wire 91 in the cable 90. Then, as shown in FIG. 6B, when the first handle plier 21 and second handle plier 22 are continuously pressed, the upper jaw section 41 and lower jaw section 42 are divided into two parts. The first upper jaw section 411 and the first lower jaw section 421 sandwich a section of the insulating layer 92, and the second upper jaw section 412 and the second lower jaw section 422 sandwich another section of the insulating layer 92 such that the already cut insulating layer 92 can be removed from the wire.

In addition to the above-mentioned elements, the hand tool 1 with a stripping function of the present invention may also include other elements. Since the technology of other elements is not the focus of the present invention, it will not be further described here. Moreover, the present invention is not limited to the embodiments of the above-mentioned hand tool 1.

It can be seen from the above description that the hand tool 1 of the present invention has a wire stripping function and thereby can help a user by providing convenience of transportation and operation.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A hand tool with the stripping function, used to cut an insulation layer of a cable, comprising:
    a first body having a first moving piece and a first fixing member;
    a second body arranged symmetrically with the first body and having a second moving piece and a second fixing member;
    a first handle plier connected to the first moving piece;
    a second handle plier arranged symmetrically with the first handle plier and connected to the second moving piece;
    a pivot pivotally connected to the first body, the second body, the first handle plier, and the second handle plier simultaneously;
    an upper jaw section connected to the first moving piece and the second moving piece;
    wherein the upper jaw section further comprises a first upper jaw section and a second upper jaw section, the first upper jaw section is connected to the first moving piece, the second upper jaw section is connected to the second moving piece; and
    a lower jaw section connected to the first fixing member and the second fixing member, wherein the upper jaw section is arranged symmetrically with the lower jaw section; wherein the lower jaw section further comprises a first lower jaw section and a second lower jaw section, the first lower jaw section being connected to the first fixing member and the second lower jaw section being connected to the second fixing member; wherein the first moving piece further comprises a first connecting rod and a first L-shaped structure, the first connecting rod is connected to the first handle plier and the first L-shaped structure is connected to the first connecting rod and the first upper jaw section; wherein the second moving piece further comprises a second connecting rod and a second L-shaped structure, the second connecting rod is connected to the second handle plier and second L-shaped structure connected to the second connecting rod and the second upper jaw section; wherein:
    the first L-shaped structure further comprises a first slot matched with a first limiter and a second limiter, wherein the first limiter and the second limiter are connected to the first fixing member; and
    the second L-shaped structure further comprises a second slot matched with a third limiter and a fourth limiter, wherein the third limiter and the fourth limiter are connected to the second fixing member; thus, the movement ranges of the first L-shaped structure and the second L-shaped structure are limited; wherein when the first handle plier and the second handle plier are pressed, the first L-shaped structure and the second L-shaped structure are pulled by the first connecting rod and the second connecting rod, which further causes the upper jaw section to approach the lower jaw section so as to cut the insulating layer of the cable; wherein after the first handle plier and the second handle plier are continuously pressed, the first connecting rod and the second connecting rod are continuously pulled such that the first upper jaw section of the upper jaw section is separated from the second upper jaw section and the first lower jaw section of the lower jaw section is separated from the second lower jaw section so as to remove the section of the insulating layer which has been cut.

2. The hand tool with the stripping function as claimed in claim 1, further comprising:
    a first clamping member vertically connected to the first L-shaped structure and fixedly connected to the first upper jaw section; and
    a second clamping member vertically connected to the second L-shaped structure and fixedly connected to the second upper jaw section.

3. The hand tool with the stripping function as claimed in claim 2, further comprising:
    a third clamping member vertically connected to the first fixing member and fixedly connected to the first lower jaw section; and
    a fourth clamping member vertically connected to the second fixing member and fixedly connected to the second lower jaw section.

4. The hand tool with the stripping function as claimed in claim 1, further comprising a compression spring, wherein one end of the compression spring is connected to the first handle plier and the other end of the compression spring is connected to the second handle plier.

* * * * *